(12) United States Patent
Murakami et al.

(10) Patent No.: US 7,223,452 B2
(45) Date of Patent: *May 29, 2007

(54) OPTICAL FILM, METHOD FOR PRODUCING THE SAME, AND IMAGE DISPLAY DEVICE USING THE SAME

(75) Inventors: Nao Murakami, Ibaraki (JP); Yuuichi Nishikouji, Ibaraki (JP); Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/551,959

(22) PCT Filed: Apr. 28, 2004

(86) PCT No.: PCT/JP2004/006232

§ 371 (c)(1),
(2), (4) Date: Oct. 6, 2005

(87) PCT Pub. No.: WO2004/097470

PCT Pub. Date: Nov. 11, 2004

(65) Prior Publication Data

US 2006/0182896 A1  Aug. 17, 2006

(30) Foreign Application Priority Data

May 2, 2003 (JP) .............................. 2003-127346

(51) Int. Cl.
*G02F 1/3363* (2006.01)

(52) U.S. Cl. .................... 428/1.3; 428/1.1; 427/163.1; 349/118; 349/120; 359/494; 359/499

(58) Field of Classification Search ................. 428/1.1, 428/1.3; 349/117–122, 143, 158; 359/494, 359/499
See application file for complete search history.

(56) References Cited

U.S. PATENT DOCUMENTS 5,344,916 A * 9/1994 Harris et al. ................. 528/353

(Continued)

FOREIGN PATENT DOCUMENTS

EP  0487359 A2  5/1992

(Continued)

OTHER PUBLICATIONS

F. Li et al., "Diamine architecture effects on glass transitions, relaxation processes and other material properties in organo-soluble aromatic polyimide films", Polymer 40, 1999, pp. 4571-4583.
International Preliminary Report on Patentability of corresponding international application No. PCT/JP2004/006232 issued Mar. 16, 2006.

*Primary Examiner*—Rena Dye
*Assistant Examiner*—Sow-Fun Hon
(74) *Attorney, Agent, or Firm*—Westerman, Hattori, Daniels & Adrian LLP

(57) ABSTRACT

An optical film, which includes a laminate of a base and a birefringent layer, and which is excellent in adhesiveness between the base and the birefringent layer, is provided. The birefringent layer is formed on the base by: coating a material of the birefringent layer on the base so as to form a coating film; stretching/shrinking the base so as to stretch/shrink the coating film; and solidifying the material of the coating film. The material is dispersed or dissolved previously in a solvent and coated in a form of solution, where the solvent used exhibits solubility with respect to the base, and in the coating step, the solvent is infiltrated into a part of the interior of the base, thereby obtaining an optical film with excellent adhesiveness between the base and the birefringent layer.

17 Claims, 2 Drawing Sheets

U.S. PATENT DOCUMENTS

| | | | |
|---|---|---|---|
| 5,528,400 A * | 6/1996 | Arakawa | 349/117 |
| 5,550,661 A * | 8/1996 | Clark et al. | 349/117 |
| 5,625,474 A * | 4/1997 | Aomori et al. | 349/79 |
| 5,750,641 A * | 5/1998 | Ezzell et al. | 528/353 |
| 5,815,253 A * | 9/1998 | Kim et al. | 356/72 |
| 5,999,243 A * | 12/1999 | Kameyama et al. | 349/185 |
| 6,166,799 A * | 12/2000 | Kameyama et al. | 349/185 |
| 6,359,669 B1 * | 3/2002 | Dehmlow | 349/62 |
| 6,795,246 B2 * | 9/2004 | Yano et al. | 359/500 |
| 6,881,456 B2 * | 4/2005 | Yano et al. | 428/1.3 |

FOREIGN PATENT DOCUMENTS

| | | |
|---|---|---|
| EP | 1 160 591 A1 | 12/2001 |
| JP | 3-24502 A | 2/1991 |
| JP | 3-33719 A | 2/1991 |
| JP | 4-194820 A | 7/1992 |
| JP | 8-511812 A | 12/1996 |
| JP | 10-508048 A | 8/1998 |
| JP | 2000-190385 | 7/2000 |
| JP | 2000-511296 A | 8/2000 |
| JP | 2001-49110 A | 2/2001 |
| JP | 2001-343529 A | 12/2001 |
| JP | 2002-169001 | 6/2002 |
| JP | 2002-328233 | 11/2002 |
| JP | 2003-57415 | 2/2003 |
| WO | WO 94/24191 A1 | 10/1994 |
| WO | WO 96/11967 A1 | 4/1996 |
| WO | WO 97/44704 A1 | 11/1997 |
| WO | WO01/037007 | 5/2001 |

* cited by examiner

OPTICAL FILM, METHOD FOR PRODUCING THE SAME, AND IMAGE DISPLAY DEVICE USING THE SAME

TECHNICAL FIELD

The present invention relates to an optical film, a method for producing the same, and various image display devices using the same.

BACKGROUND ART

Conventionally, various retardation plates have been used for optical compensation in various liquid crystal displays. An example of the retardation plates is an optically-biaxial retardation plate, and it can be produced in general by any of various polymer-film stretching methods (see JP3(1991)-33719 A, for example) like roller tensile stretching, roller press stretching, and tenter transverse uniaxial stretching, or a method of providing anisotropy through biaxial stretching (see JP3(1991)-24502 A, for example). Additional examples include a retardation plate in which a uniaxially stretched polymer film having a positive optical anisotropy and a biaxially stretched polymer film having a negative optical anisotropy and whose in-plane retardation is small are used in combination (see JP4(1992)-194820 A, for example), and a retardation plate formed, not by the above-mentioned stretching, but by processing polyimide into a film on a substrate and thus provided with a negative uniaxiality derived from the nature of the polyimide itself (see JP8 (1996)-511812 A, for example).

According to the above-mentioned film-stretching technique or the like, the thus formed stretched film can be provided with, for example, a negative biaxial optical property of nx>ny>nz. Here, nx, ny and nz indicate respectively refractive indices in directions of an X-axis, a Y-axis, and a Z-axis in the stretched film. The X-axis direction is a direction showing a maximum refractive index within the plane of the film, the Y-axis direction is a direction perpendicular to the X-axis direction within the plane, and the Z-axis direction is a thickness direction and is perpendicular to the X- and Y-axes directions. When arranged between a liquid crystal cell and a polarizer of a liquid crystal display, a retardation film having the above-stated optical property can widen a viewing angle of the liquid crystal display, and thus it is useful as a viewing angle compensating film for the liquid crystal cell.

DISCLOSURE OF INVENTION

The retardation film exhibiting the optical property may be formed on a substrate for example, and used in a state laminated on the substrate, in light of its strength and workability. However, such a lamination type retardation film has some problems as described below. For example, though such a lamination retardation film includes a birefringent layer formed on a base, adhesiveness between the base and the birefringent layer is insufficient in many cases, and thus the birefringent layer may be peeled off under a heating condition, a humidifying condition, a cooling condition or the like. As a result, in a case of assembling the lamination retardation film in an image display device such as a liquid crystal display, the above-mentioned peeling can cause optical distortion and degrade the display quality.

Therefore, with the foregoing in mind, it is an object of the present invention to provide an optical film being excellent in adhesiveness between its base and its birefringent layer.

For achieving the above-mentioned object, a method for producing an optical film according to the present invention is a method for producing an optical film including a base and a birefringent layer, and the method includes: a step of coating on a base a material for forming a coating film to be a birefringent layer; and a step of solidifying the coating film on the base so as to form a birefringent layer. The material is previously dispersed or dissolved in a solvent in order to prepare a solution to be coated, and the solvent exhibits solubility with respect to the base.

In this manner, a coating solution for forming the birefringent layer is prepared by using a solvent exhibiting solubility with respect to the base, and the thus prepared solution is coated on the base so that the solvent in the solution is infiltrated through the surface of the base. As a result of the infiltration of the solvent into a part of the base, adhesiveness between the base and the birefringent layer formed on the base will be improved. The inventors of the present invention were the first to find that the adhesiveness can be improved in this manner. It is considered that the adhesiveness between the base and the birefringent layer can be improved by this method as a result of the infiltration of the solvent due to the following reasons. That is, 1) the surface of the base is dissolved partially by the solvent and roughened, and thus an area contacted with the birefringent layer is increased to improve adhesiveness; 2) molecular disposition of the base changes due to the dissolution of the base, and thus the adhesiveness with the birefringent layer is improved; or 3) the base surface is melted by the solvent so as to form a compatible layer (a layer where base ingredients, the solvent and the material of the birefringent layer are mixed) between the base and the birefringent layer so as to improve the adhesiveness. Due to the excellent adhesiveness between the base and the birefringent layer, when an optical film produced according to the present invention is used for an image display device such as a liquid crystal display or the like, it can provide some effects that cannot be obtained in conventional techniques, that is, optical distortion is prevented and a preferable visibility is provided.

Next, an optical film of the present invention includes a laminate of a base and a birefringent layer, and it can be produced according to a production method of the present invention. Since this optical film is excellent in adhesiveness between the base and the birefringent layer, for example, it can prevent optical distortion and improve visibility when being used for a liquid crystal display. Therefore, it can be used preferably for any types of image display devices such as liquid crystal displays and self-light-emitting displays.

DESCRIPTION OF THE INVENTION

Figure 1:
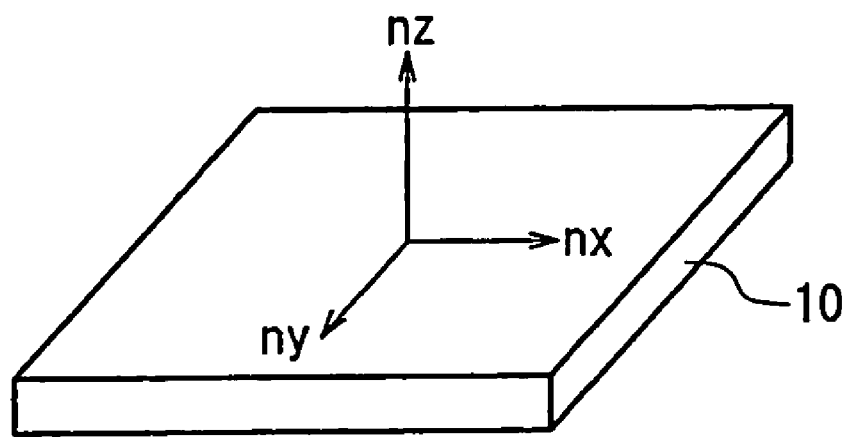
FIG. 1 is a perspective view showing optical axis directions in a birefringent layer according to the present invention.

As mentioned above, a method for producing an optical film of the present invention includes a step of coating on a base a material of a birefringent layer to form a coating film, and a step of solidifying the coating film on the base so as to form a birefringent layer, wherein the material is dispersed or dissolved in a solvent to prepare a solution to be coated on the base, and the solvent used exhibits solubility with respect to the base.

The production method of the present invention can further include a step of stretching or shrinking the base so as to stretch or shrink the coating film on the base or the solidified birefringent layer.

In the present invention, "stretching the base so as to stretch the coating film or the solidified birefringent layer" denotes stretching the base alone, thereby stretching the coating film or the birefringent layer on the base. This expression indicates also stretching the laminate of the base and either the coating film or the birefringent layer together. The step of stretching/shrinking can be carried out at the same time as the step of solidifying the coating film, or it can be carried out with respect to the birefringent layer after the solidification step.

Though there is no particular limitation, the material of the birefringent layer is preferably a non-liquid crystalline material, more particularly, a non-liquid crystalline polymer. By using the non-liquid crystal material, for example, unlike a case of a liquid crystalline material, a film thus formed can exhibit an optically-negative uniaxiality (nx>nz), (ny>nz) by its own nature, regardless of the alignment of the base. For this reason, the substrate is not limited to an alignment substrate but it can be a non-alignment substrate, for example. That is, unlike when using a liquid crystalline material, there is no necessity of forming an alignment film or lamination on the surface for the purpose of providing birefringence.

For the non-liquid crystalline polymer, polymers such as polyamide, polyimide, polyester, polyarylether ketone, polyether ketone, polyamideimide, and polyester imide are preferred in light of, for example, the excellent heat resistance, chemical resistance, transparency and rigidity. Any of these polymers can be used alone, or can be used as a mixture of at least two kinds of polymers having different functional groups, e.g., a mixture of polyarylether ketone and polyamide. Among these polymers, polyimide is particularly preferred for example, for the birefringence.

The molecular weight of the polymer is not limited particularly, but, for example, the weight average molecular weight (Mw) is preferably in a range of 10,000 to 400,000, more preferably in a range of 30,000 to 400,000, and particularly preferably in a range of 50,000 to 200,000. The weight average molecular weight can be measured by a gel permeation chromatography (GPC), using, for example, polyethylene oxide as a standard sample, and DMF (N,N-dimethylformamide) as a solvent. Since the birefringence Δn and the viscosity of the coating solution mentioned below rise with an increase in the molecular weight, for obtaining a high Δn, Mw is preferably 30,000 or higher, and a range of 50,000 to 200,000 is preferred so as to provide a viscosity to facilitate the coating.

As the polyimide, it is preferable to use a polyimide that has a high in-plane alignment and is soluble in an organic solvent. For example, it is possible to use a condensation polymer of 9,9-bis(aminoaryl)fluorene and an aromatic tetracarboxylic dianhydride disclosed in JP 2000-511296 A, and more specifically, a polymer containing at least one repeating unit represented by the formula (1) below.

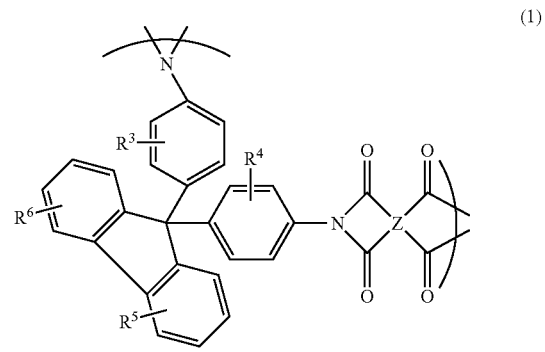

In the above formula (1), $R^3$ to $R^6$ are each at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are each at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

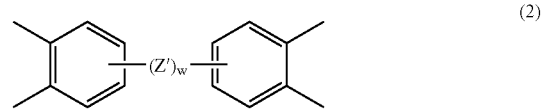

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, a $C_{1-20}$ alkyl group or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP8(1996)-511812 A may be used, for example. The polyimide represented by the formula (5) below is a preferable mode of the homopolymer represented by the formula (3) below.

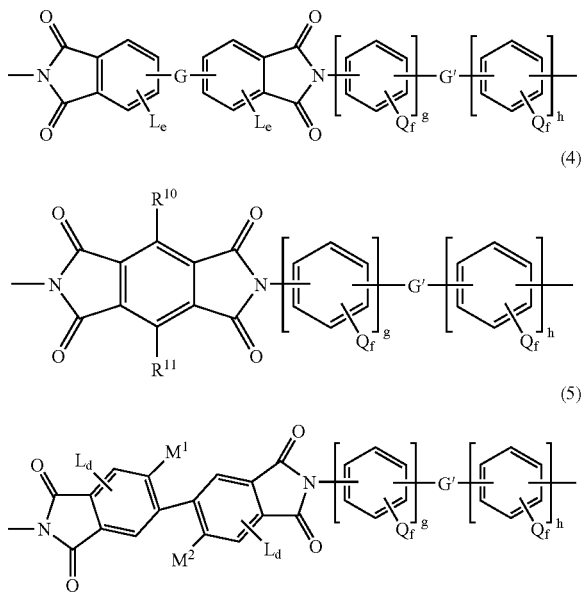

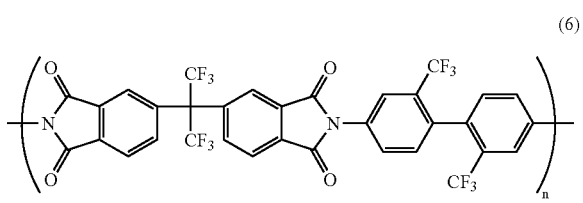

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are each groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

Moreover, the above-mentioned polyimide may be, for example, copolymer obtained by copolymerizing acid dianhydride and diamine other than the above-noted skeleton (repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalenetetracarboxylic dianhydride, 1,2,5,6-naphthalenetetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

The polyetherketone may be, for example, polyaryletherketone represented by the general formula (7) below, which is disclosed in JP 2001-49110 A.

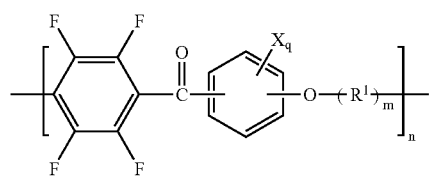

(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight or branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

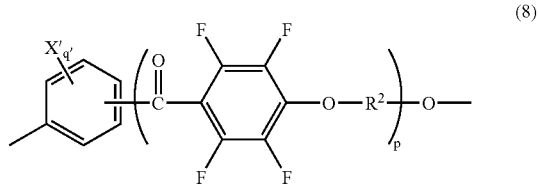

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

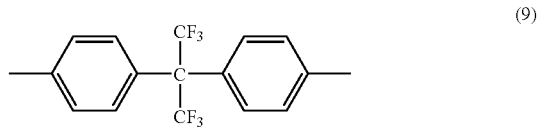

(9)

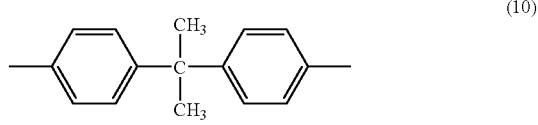

(10)

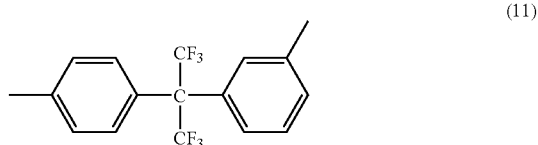

(11)

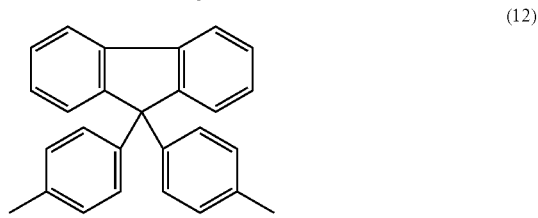

(12)

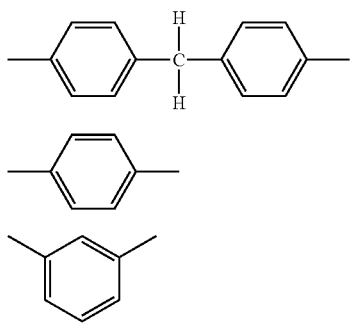

(13)

(14)

(15)

In the above formula (7), the $R^1$ preferably is a group represented by the formula (16) below, wherein $R^2$ and p are equivalent to those in the above-noted formula (8).

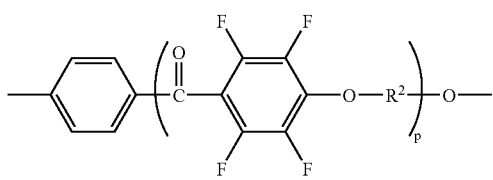

(16)

Furthermore, in the formula (7), n indicates a degree of polymerization ranging, for example, from 2 to 5000 and preferably from 5 to 500. The polymerization may be composed of repeating units with the same structure or with different structures. In the latter case, the polymerization form of the repeating units may be block polymerization or random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

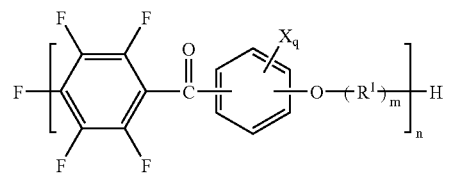

(17)

Specific examples of the polyaryletherketone represented by the formula (7) may include those represented by the formulae (18) to (21) below, wherein n indicates a degree of polymerization as in the formula (7).

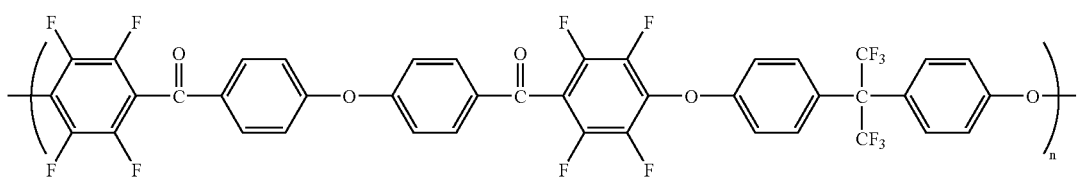

(18)

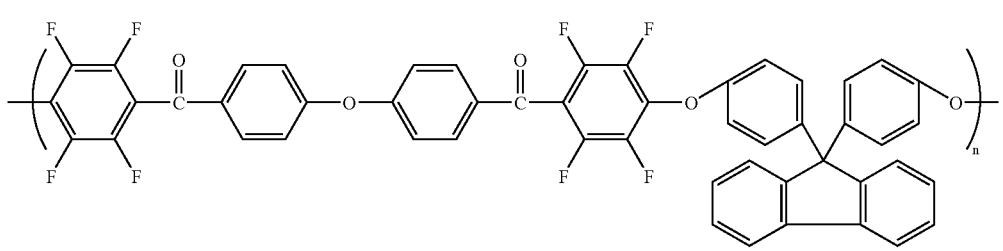

(19)

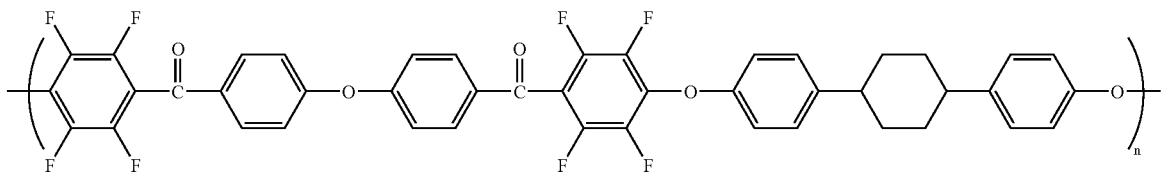

(20)

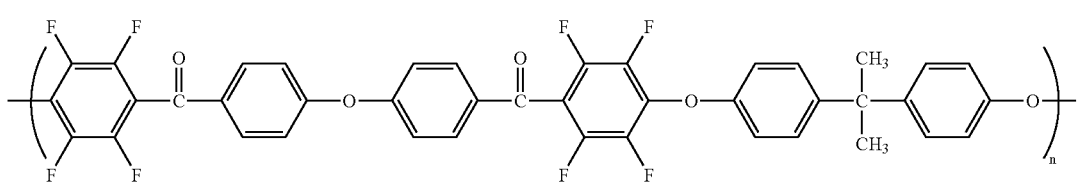

(21)

Other than the above, the polyamide or polyester may be, for example, polyamide or polyester described by JP H10 (1998)-508048 A, and their repeating units can be represented by the general formula (22) below.

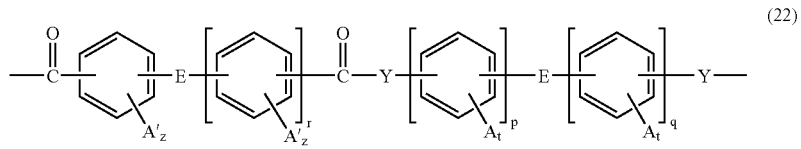

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural As, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

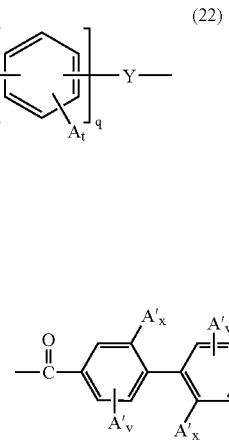

(23)

In the formula (23), A, A' and Y are as defined in the formula (22), and v is an integer from 0 to 3, preferably is an integer from 0 to 2. Although each of x and y is 0 or 1, not both of them are 0.

It is preferable that the base is made of a transparent polymer so as to be used as a laminate including the birefringent layer. Though there is no particular limitation about the transparent polymer, thermoplastic resins are preferred since they are suitable for treatments of stretching and shrinking as mentioned below. Specific examples include acetate resin such as triacetylcellulose (TAC), polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, and a mixture thereof. In addition, liquid crystal polymers and the like also can be used. Another example of the materials described in JP 2001-343529 A (WO 01/37007) is a mixture containing a thermoplastic resin whose side chain has a substituted or unsubtituted imido group and a thermoplastic resin whose side chain has a substituted or unsubtituted phenyl group and nitrile group, more specifically, a resin composition containing an alternating copolymer of isobutene and N-methylene maleimide and an acrylonitrile-styrene copolymer. Among them, it is particularly preferred for materials that birefringence of the transparent film formed using the materials become a relatively lower value. Specifically, a mixture of the above-mentioned thermoplastic resin whose side chain has a substituted or unsubstituted imide group and a thermoplastic resin whose side chain has substituted or unsubstituted phenyl group and a nitryl group is preferred.

The base can be a single layer or a laminate of plural layers. When the base is a laminate, it can be composed of one or various kind(s) of polymer layers, depending on its objects such as improvement in the strength, heat resistance and adhesiveness of birefringent layers.

As described above, since the birefringent layer composed of the non-liquid crystalline polymer exhibits an optical uniaxiality depending on the nature of the polymer, there is no necessity of using alignment of the base during a step of formation. Therefore, both an alignment base and a non-alignment base can be used as the base. The base can have a phase difference caused by birefringence, though the phase difference is not an essential property. An example of the base that has a phase difference caused by the birefringent effect includes a stretched film. The stretched film can have a refractive index controlled in the thickness direction, for example. The refractive index can be controlled by, for example, adhering a polymer film to a heat shrinkable film, and subsequently heat stretching.

When the base exhibits a phase difference due to birefringence, for example, a birefringence $\Delta n(b)$ of the base and a birefringence $\Delta n(a)$ of a birefringent layer formed on the base preferably meets a relationship of a condition (II) below.

$$\Delta n(a) > \Delta n(b) \times 10 \quad \text{(II)}$$

Preferred examples of the base include a base having a low glass transition temperature (Tg), a base having a high elastic modulus, a base having thermal expansion being equal to or greater than that of the birefringent layer, a base having a high heat conductivity, a base having a high aspect ratio, a thin base or the like.

An optical film of the present invention can be produced, for example, by the process below.

First, a material for the birefringent layer is dispersed or dissolved in a solvent so as to prepare a solution (coating solution).

In the present invention, since the solvent must be infiltrated into the base during the subsequent step of forming a coating film, a solvent having solubility with respect to the base must be selected. The type of the solvent is not limited particularly as long as it is determined in accordance with the type of the base (kind of the base material) and that the solvent can dissolve and/or disperse the material of the birefringent layer.

Examples of the solvent include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more.

Specific examples for a combination of a base and a solvent are as follows. When the transparent polymer of the base is TAC, for example, ethyl acetate, cyclohexanone, cyclopentanone, acetone and the like can be used for the solvent. When the transparent polymer of the base is at least either a copolymer of isobutene and N-methylene maleimide or a copolymer of acrylonitrile-styrene copolymer, for example, methyl isobutyl ketone, methyl ethyl ketone, cyclohexanone, cyclopentanone, acetone or the like can be used.

Though a concentration of the material of the birefringent layer in the coating solution is not limited particularly, it is preferably in a range of 5 to 50 weight parts with respect to 100 weight parts of the solvent, and more preferably, in a range of 10 to 40 weight parts. In a specific example where the material is a non-liquid crystalline polymer, the amount of the polymer to be added is preferably in a range of 5 to 50 weight parts, and more preferably 10 to 40 weight parts with respect to 100 weight parts of the solvent.

In the coating solution, various additives such as a stabilizer, a plasticizer, metal and the like may be blended further as necessary.

Moreover, the coating solution may contain other resins as long the content may not degrade considerably the alignment of the like of the material. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the additive resins or the like are blended in the coating solution, the blend percent to the polymer material is, for example, from 0 to 50 wt %, and preferably from 0 to 30 wt %.

Next, the thus prepared coating solution was coated on the base surface so as to form a coating film of the material. At this time, the solvent in the coating solution is infiltrated through the surface of the base. As a result of infiltration of the solvent, the part of the base at which the solvent is infiltrated changes its state. Hereinafter, the part where the solvent is infiltrated will be referred to as a 'solvent infiltration layer' in the base.

The thickness of the solvent infiltration layer varies depending on the combinations or the like of the base and the solvent. For example, it is preferable that $D(y) > D(a) \times 0.01$ where $D(y)$ is a thickness of the solvent infiltration layer in the base with respect to a thickness ($D(a)$) of the birefringent layer. When the relationship of $D(y) > D(a) \times 0.01$ is satisfied, a sufficient adhesiveness can be provided to the interface between the base and the birefringent layer. More preferably, the thickness is $D(a) \times 0.5 > D(y) > D(a) \times 0.01$ from an aspect of sufficiently maintaining durability of the base. Further preferably, $D(a) \times 0.3 > D(y) > D(a) \times 0.01$. Specifically for example, when the birefringent layer has a thickness of 6 µm, preferably the solvent infiltration layer has a thickness of 0.06 to 3 µm, and more preferably 0.06 to 1.8 µm. Here, the thickness of the solvent infiltration layer is not necessarily uniform, but it can be uneven.

The method of coating the solution is selected, for example, from spin coating, roller coating, flow coating, printing, dip coating, flow-expanding, bar coating and gravure printing. In the coating, a method of superimposing polymer layers can be used as required.

Though the thickness of the base is not limited particularly, it is in a range of 10 to 200 µm for example in a case where stretching as described below is performed after formation of the coating film, or preferably in a range of 20 to 150 µm, and particularly preferably in a range of 30 to 100 µm.

Subsequently, the coating film on the base is solidified to develop birefringence, thereby forming a birefringent layer. The solidification can be carried out by drying the coating film. That is, when the coating film on the base is solidified in this manner, the non-liquid crystalline polymer such as polyimide will exhibit an optical property of nx>nz, ny>nz by its nature regardless of alignment of the base, and as a result, the birefringent layer composed of the polymer exhibits an optically negative uniaxiality.

The drying method is not particularly limited but can be air drying or heat drying, for example. The conditions therefor can be determined suitably according to, for example, kinds of the material for the birefringent layer and the solvent. For instance, the temperature therefor usually is 40° C. to 300° C., preferably is 50° C. to 250° C., and further preferably is 60° C. to 200° C. The coated surface may be dried at a constant temperature or by gradually rising/lowering the temperature. The drying time is not particularly limited as well but it usually is 10 seconds to 30 minutes, preferably 30 seconds to 25 minutes, and further preferably 1 minute to 20 minutes.

The thickness of the birefringent layer formed on the base is not particularly limited, but it is in a range of 0.5 to 40 µm for example, preferably in a range of 1 to 20 µm, and more preferably in a range of 1 to 10 µm.

The solvent of the polymer solution remaining in the coating film may change the optical properties of the laminated optical film over time after the heating treatment, in proportion to the amount. Therefore, the amount of the solvent is preferably, for example, 5% or less, more preferably, 2% or less, and further preferably, 0.2% or less.

In the present invention, as mentioned above, the birefringent layer can be stretched further. The optical properties of the optical film of the present invention can be changed further by the stretching.

Specifically, after forming the optically uniaxial birefringent layer on the base, the base is stretched further to stretch together the birefringent layer on the base. By stretching the birefringent layer in one direction within the plane in this manner, the birefringent layer exhibiting an optical uniaxiality as mentioned above develops further differences in the refractive indices within a plane, thereby exhibiting an optical biaxiality (nx>ny>nz).

Stretching of the birefringent layer is not limited to this method. Though it can be carried out also by pulling the laminate of the base and birefringent layer together, it is preferable that the base is stretched alone due to the following reason. When the base is stretched alone, the birefringent layer on the base is stretched indirectly due to a tensile force generated in the base as a result of the stretching. Since in general a single layer can be stretched more uniformly in comparison with a case of stretching a laminate, the coating film on the base can be stretched uniformly as a result of stretching the base alone as mentioned above.

There is no particular limitation about the method of stretching. Examples of the stretching methods include stretching the film uniaxially in the longitudinal direction (free-end longitudinal stretching), stretching the film uniaxially in the transverse direction while the film is fixed in the longitudinal direction (fixed-end transverse stretching), and stretching the film both in the longitudinal and transverse directions (sequential or simultaneous biaxial stretching).

The condition for the stretching is not limited particularly but it can be determined suitably depending on the kinds or the like of the materials for the base and the birefringent layer. Specifically, the stretching ratio is preferred to be more than 1 and not more than 5, and more preferably, it is more than 1 and not more than 4, and particularly preferably, it is more than 1 and not more than 3.

Instead of performing the above-mentioned stretching, it is also possible to form on a base a birefringent layer exhibiting a negative biaxiality, using shrinkage of the base. Specifically in the method, the optically uniaxial birefringent layer is formed directly on a base exhibiting shrinkage property in one direction within the plane, thereby shrinking the birefringent layer as a result of shrinkage of the base. According to this method, the birefringent layer formed on the base as mentioned above is shrunk similarly together with the shrinkage of the base. Therefore, the birefringent layer will possess a difference in the refractive indices further within the plane, thereby exhibiting an optical biaxiality (nx>ny>nz).

The shrinkage property of the base can be provided by fixing one end of the base and stretching in one direction within the plane before coating the material. By previously stretching as mentioned above, a shrinkage force is generated in a direction opposite to the stretching direction. This difference in the in-plane shrinkage of the base is used for providing a difference in the refraction within the plane (in-plane retardation) to the birefringent layer. Specific conditions therefor are mentioned below.

Though there is no particular limitation, the base before stretching has a thickness in a range, for example, from 10 to 200 µm, preferably from 20 to 150 µm, and particularly preferably from 30 to 100 µm. The stretch ratio is not limited particularly as long as the birefringent layer to be formed on the stretched base exhibits an optical biaxiality (nx>ny>nz).

The method for providing shrinkage property to the base is not limited to this example. Alternatively for example, a shrinkage property can be provided in all azimuths by drying the base without fixing. Other examples for the methods include: 1) fixing in at least one direction and controlling the shrinkage in the remaining directions; 2) controlling shrinkage by a tenter-fixing at the time of continuous production on line; 3) expanding previously the base so as to increase the shrinkage rate by drying; 4) stretching the base before a drying step so as to solidify-shrink the base; and 5) stretching the base during/after a drying step.

Next, a birefringent layer is formed as mentioned above on a base having the shrinkage property. And the base is heated to shrink. With the shrinkage of the base, the birefringent layer on the base shrinks as well, thereby the birefringent layer will exhibit a negative biaxiality. Though the condition for the heating can be determined suitably depending on the kinds of the materials or the like without any particular limitations, for example, the temperature for heating is in a range of 25° C. to 300° C., preferably, 50° C. to 200° C., and particularly preferably, 60° C. to 180° C.

When the base is subjected to any additional steps of stretching or shrinking as mentioned above, a step of solidifying the coating film can be carried out simultaneously in the stretching/shrinking step. That is, the stretching/shrinking step can be carried out to the thus formed birefringent layer after the solidifying step, or the stretching/shrinking step can be included in a solidifying step that is carried out with respect to a coating film.

An optical film produced by the method of the present invention is not limited to the above-mentioned optical film exhibiting an optical uniaxiality or biaxiality. It can be also an optical film or the like composed of materials with inclined alignment as long as a solvent having solubility with respect to the base is used in the method.

An optical film of the present invention produced in the method has a birefringent layer directly formed on a base, and the solvent is infiltrated into the base as mentioned above so as to form a solvent infiltration layer, thereby providing a film with excellent adhesiveness between the base and the birefringent layer. Therefore, when the film is used for an image display device or the like, it can provide an excellent contrast at a wide viewing angle and also provide effects of suppressing optical distortion and improving the display quality.

The optical film of the present invention has the base and the birefringent layer formed on the base, and the solvent infiltration layer is formed on the birefringent layer side of the base. This solvent infiltration layer can be observed for example, visually or by using a SEM (scanning electron microscope) or a TEM (transmission electron microscope). For example, in an observation with the SEM or the like, interfaces can be found between the base part (L) in which the solvent is not infiltrated, the base part (i.e., a solvent infiltration layer: M) in which the solvent is infiltrated, and the birefringent layer (N) respectively. This shows that the layer between the base part (L) and the birefringent layer (N) is the solvent infiltration layer (M). Generally, observation of the interfaces is carried out visually. When the visual observation of the interfaces is uncertain, the cross section IR can be used for decision.

It is preferable in the optical film of the present invention that the birefringent layer and the base satisfy all the conditions (I) to (III) below:

$$\Delta n(a) > \Delta n(b) \times 10 \tag{I}$$

$$1 < (nx-nz)/(nx-ny) \tag{II}$$

$$0.0005 \leq \Delta n(a) \leq 0.5 \tag{III}$$

In the above conditions (I) to (III), $\Delta n(a)$ denotes a birefringence of the birefringent layer (a), and $\Delta n(b)$ denotes a birefringence of the base. They are represented respectively by the formulae below. In the formulae and the above condition (II), nx, ny and nz denote respectively refractive indices in the X-, Y-, and Z-axes in the birefringent layer (a), and nx', ny' and nz' denotes respectively refractive indices in the X-, Y-, and Z-axes in the base (b). The X-axis denotes an axial direction presenting a maximum refractive index within the birefringent layer (a) and the base, the Y-axis denotes an axial direction perpendicular to the X-axis within the plane, and the Z-axis denotes a thickness direction perpendicular to the X-axis and the Y-axis.

$$\Delta n(a) = [(nx+ny)/2] - nz$$

$$\Delta n(b) = [(nx'+ny')/2] - nz'$$

For example, optical axes directions of refractive indices (nx, ny, nz) in the birefringent layer 10 are shown with arrows in the schematic view of FIG. 1. The refractive indices nx, ny and nz are as mentioned above.

In the optical film of the present invention, since optical compensation is performed in general in the birefringent layer, preferably the condition (I) is satisfied so that the birefringence of the base will not hinder the optical compensation. Furthermore, for providing an optical film having excellent visual compensation and display characteristics, it is preferable that the relationship between the $\Delta n(a)$ and $\Delta n(b)$ is $\Delta n(a) > \Delta n(b) \times 15$, for example, and more preferably, $\Delta n(a) > \Delta n(b) \times 20$.

The condition (I) can be satisfied for example, by selecting the base and the material for the birefringent layer in the production method of the present invention. It is preferable in the method, for example, a material to form a birefringent layer having a relatively high birefringence is selected, while a base made of a material having a relatively low birefringence when formed into a film is selected.

In the optical film of the present invention, it is preferable that the birefringent layer satisfies the condition (II). When the optical film of the present invention satisfies the condition of $1 < (nx-nz)/(nx-ny)$, the birefringence in the thickness direction becomes greater than the in-plane birefringence of the film, and thus the optical film will have excellent function, for example, in optically compensating a liquid crystal cell. Preferably, it is $1 < (nx-nz)/(nx-ny) \leq 100$. When the value is 100 or less, for example, in a case where the optical film of the present invention is used for a liquid crystal display, a sufficient contrast can be obtained and the viewing angle characteristics can be improved further. Furthermore, the value of $(nx-nz)/(nx-ny)$ is preferably in a range of $1 < (nx-nz)/(nx-ny) \leq 80$ for an excellent optical compensation, and further preferably $1 < (nx-nz)/(nx-ny) \leq 50$. It is particularly preferred that the value is $1 \leq (nx-nz)/(nx-ny) \leq 30$ in a use for a vertical alignment (VA) mode liquid crystal display.

In the present invention, it is preferable that the birefringent layer (a) satisfies the condition (III). When the $\Delta n(a)$ is 0.0005 or more, the thickness of the optical film can be decreased further, and when it is 0.5 or less, the retardation of the optical film can be controlled more easily. More preferably, the refractive index is $0.005 \leq \Delta n(a) \leq 0.2$, and particularly preferably $0.02 \leq \Delta n(a) \leq 0.15$.

In the present invention, the thickness of the birefringent layer is not limited particularly, and it is within the above-mentioned range since the thickness of the liquid crystal display can be decreased and an optical film having an excellent function in visual angle compensation and also a uniform phase difference can be provided. Similarly, the thickness of the base can be decided suitably depending on the use or the like, and it can be decided as mentioned above from a viewpoint of strength and reduction in the film thickness.

The birefringent layer can be laminated on either or both surfaces of the base, and the laminate can include one or plural layer(s).

Moreover, it is preferable that the optical film of the present invention further has a pressure-sensitive adhesive layer as the outermost layer. The pressure-sensitive adhesive layer facilitates adhesion of the optical film of the present invention to the other optical layers or the other members such as a liquid crystal cell and also prevents peeling of the optical film of the present invention. The pressure-sensitive adhesive layer can be one of the outermost layers of the optical film, or it can be laminated as the outermost layers on both the surfaces. When the pressure-sensitive adhesive layers are arranged on both the surfaces, they can be the same type or they can be different from each other in composition and type.

The thickness of the pressure-sensitive adhesive layer can be determined suitably for example, according to a configuration or the like of the optical film. In general, the thickness is 1 to 500 nm.

It is preferable that the material of the pressure-sensitive adhesive layer has excellent optical transparency, appropriate wettability, and sticking characteristics such as cohesiveness and adhesiveness. For specific example, the pressure-sensitive adhesive can be prepared appropriately based on polymers such as an acrylic polymer, a vinyl alcohol-based polymer, a silicone-based polymer, polyester, polyurethane, polyether, and synthetic rubber.

Further, a material having a low moisture absorption coefficient and an excellent thermal resistance is preferable from the aspects of prevention of foaming or peeling caused by moisture absorption, prevention of degradation in the optical properties and warping of a liquid crystal cell caused by difference in thermal expansion coefficients, and formation of an image display device with high quality and excellent durability. It is also possible to incorporate fine particles so as to form the pressure-sensitive adhesive layer showing light diffusion property.

For the purpose of forming the pressure-sensitive adhesive layer, a solution or melt of a sticking material can be applied directly on a predetermined surface of the film by a development method such as flow-expansion and coating. Alternatively, a pressure-sensitive adhesive layer can be formed on a separator, which will be described below, in the same manner and transferred to a predetermined surface of the film.

Sticking characteristics of the pressure-sensitive adhesive layer can be controlled appropriately in a known method. For example, the degree of cross-linkage and the molecular weight will be adjusted on the basis of a composition or molecular weight of the base polymer of the pressure-sensitive adhesive layer, the crosslinking system, a content of the crosslinking functional group, and an amount of the blended crosslinking agent.

In the case where a surface of the pressure-sensitive adhesive layer formed as an outermost layer of the optical film is exposed, it is preferable to cover the surface with a separator. This makes it possible to prevent the pressure-sensitive adhesive layer from being contaminated until the pressure-sensitive adhesive layer is used. The separator can be formed by, for example, providing a suitable film such as the above-mentioned transparent film with at least one release coat such as a silicone-based release agent, a long-chain alkyl-based release agent, a fluorine-based release agent or a molybdenum sulfide release agent, as necessary.

The optical film of the present invention is useful for an optical compensation member, particularly, a member for visual compensation. The optical film of the present invention can be composed of only a laminate (hereinafter referred to also as 'laminated birefringent film') of the base and the birefringent layer, or any other optical members can be included further together with the laminated birefringent film, depending on the object and necessity. For the other optical members, various members such as polarizing films (polarizers) can be used without any particular limitations.

Examples of the optical film of the present invention include a laminated polarizing plate that has a polarizer in addition to the laminated birefringent film.

Figure 2:
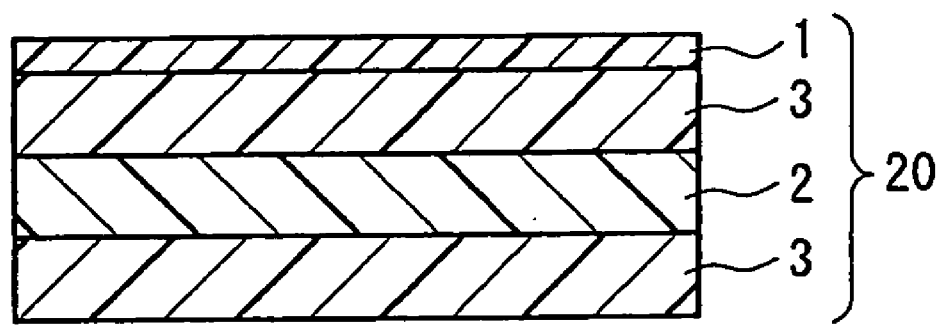
FIG. 2 is a cross-sectional view of an example of an optical film according to the present invention.
Figure 3:
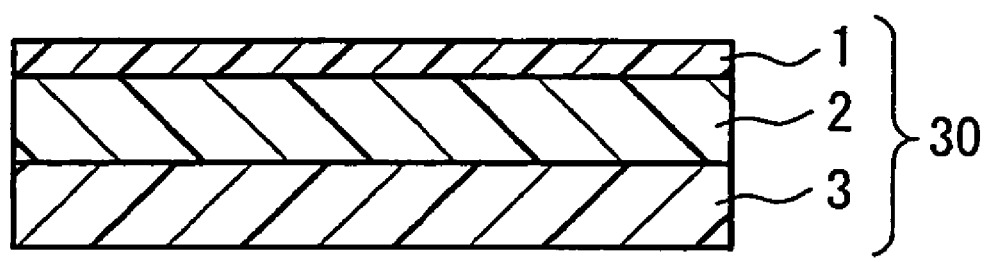
FIG. 3 is a cross-sectional view of another example of an optical film according to the present invention.

The configuration of the optical film (laminated polarizing plate) is not limited particularly as long as the optical film includes a laminated birefringent film, and examples thereof are described in FIG. 2 or FIG. 3. FIGS. 2 and 3 are cross-sectional views showing respective optical films of the present invention, and identical signs are attached to identical members. The optical film of the present invention is not limited to the configurations below but any other optical members can be included.

An optical film (laminated polarizing plate) 20 as shown in FIG. 2 has the laminated birefringent film (a laminate of a base and a birefringent layer) 1, a polarizer 2 and two transparent protective layers 3, and the transparent protective layers 3 are laminated respectively on both the surfaces of the polarizers 2, and the laminated birefringent film 1 is laminated further on one of the transparent protective layers 3. Since the laminated birefringent film 1 is a laminate of a birefringent layer and a base as mentioned above, any of the surfaces can face the transparent protective layer 3.

The transparent protective layers can be laminated on both the surfaces of the polarizer as shown in this figure. Alternatively, a transparent protective layer can be laminated on any one of the surfaces. In the case of laminating on both the surfaces, for example, the kinds of the transparent protective layers can be the same or not.

The optical film (laminated polarizing plate) 30 as shown in FIG. 3 has the laminated birefringent film (a laminate of a base and the birefringent layer) 1, a polarizer 2 and a transparent protective layer 3, where the laminated birefringent film 1 and the transparent protective layer 3 are laminated respectively on both the surfaces of the polarizer 2.

Since the laminated birefringent film 1 is a laminate of a birefringent layer and a base as mentioned above, any surface thereof can face the polarizer. For example, it is preferable that the base side of the laminated birefringent film 1 faces the polarizer 2, since the base of the laminated birefringent film 1 can function as a transparent protective layer in the laminated polarizing plate 30. That is, instead of laminating transparent protective layers on both the surfaces of the polarizer, a transparent protective layer is laminated on one surface of the polarizer while the laminated birefringent film is laminated on the other surface so as to face the base, so that the base functions as a transparent protective layer on the other side of the polarizer. Therefore, the thickness of the polarizing plate can be decreased further.

The polarizer is not particularly limited, but can be a film, for example, prepared by being dyed by adsorbing a dichroic material such as iodine or a dichroic dye, followed by cross-linking, stretching and drying. Among them, films that can penetrate linearly polarized light when natural light is entered, more specifically, films having excellent light transmittance and polarization degree are preferable. Examples of the polymer film in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, a polyene alignment film such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as cellulose triacetate, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Another example of the protective layer is a polymer film described in JP2001-343529 A (WO 01/37007). The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methylene maleimide and an acrylonitrile-styrene copolymer. Alternatively, the polymer film may be formed by extruding the resin composition.

It is preferable that the protective layer is colorless. More specifically, a retardation value (Rth) of the film in its thickness direction as represented by the condition below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are are the same as those described above, and d indicates the thickness of this film.

$$Rth=[\{(nx+ny)/2\}-nz]\cdot d$$

The transparent protective layer may further have an optically compensating function. For such a transparent protective layer having the optically compensating function, it is possible to use, for example, a known layer used for preventing coloring caused by changes in a visible angle based on retardation in a liquid crystal cell or for widening a preferable viewing angle. Specific examples include various films obtained by stretching the above-described transparent resins uniaxially or biaxially, an alignment film of a liquid crystal polymer or the like, and a laminate obtained by providing an alignment layer of a liquid crystal polymer on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-aligned layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the optical retardation film and a film support of triacetylcellulose film or the like so as to control optical properties such as retardation.

The thickness of the transparent protective layer is not particularly limited but can be determined suitably according to retardation or a protection strength. In general, the thickness is not greater than 500 μm, preferably ranges from 5 to 300 μm, and more preferably ranges from 5 to 150 μm.

The transparent protective layer can be formed suitably by a known method such as a method of coating the polarizing film with the above-mentioned various transparent resins or a method of laminating the transparent resin film, the optically compensating retardation plate or the like on the polarizing film, or can be a commercially available product.

The transparent protective layer may be further subjected to, for example, a hard coating treatment, an antireflection treatment, treatments for anti-sticking, diffusion and antiglaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a known method. The anti-sticking treatment aims at preventing adjacent layers from sticking to each other. The antireflection treatment aims at preventing reflection of external light on the surface of the polarizing plate, and can be carried out by forming a known antireflection film or the like.

The anti-glare treatment aims at preventing hindering visibility of light transmitted through the polarizing plate due to the reflection of external light on the polarizing plate surface. The anti-glare treatment can be carried out, for example, by providing microscopic asperities on a surface of a transparent protective film by a known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no particular limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no particular limitation.

An anti-glare layer in which the transparent fine particles are blended can be used as the transparent protective layer itself or provided as a coating layer or the like applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as an sheet of optical layers comprising these layers, separately from the transparent protective layer.

A method for laminating each member (a laminated birefringent film, a polarizer, a transparent protective layer, etc) is not particularly limited, and it can be a conventional method. Generally, the above-mentioned adhesive and pressure-sensitive adhesive can be used, and the kind thereof can be determined suitably depending on materials of the above-mentioned components and the polarizing plate. The adhesive can be, for example, a polymer adhesive based on acrylic substances, vinyl alcohol, silicone, polyester, polyurethane or polyether, or a rubber-based adhesive. It also is possible to use an adhesive or rubber adhesive containing a water-soluble cross-linking agent of vinyl alcohol-based polymers such as glutaraldehyde, melamine and oxalic acid. The pressure-sensitive adhesive and the adhesive mentioned above do not peel off easily even when being exposed to moisture or heat, for example, and have excellent light transmittance and polarization degree. More specifically, these pressure-sensitive adhesive and adhesive preferably are PVA-based adhesives when the polarizing plate is a PVA-based film, in light of stability of adhering treatment. These pressure-sensitive adhesive and adhesive may be applied directly to surfaces of the polarizer and the transparent protective layer, or a layer of a tape or a sheet formed of the pressure-sensitive adhesive or adhesive may be arranged on the surfaces thereof. Further, when these pressure-sensitive adhesive and adhesive are prepared as an aqueous solution, for example, other additives or a catalyst such as an acid catalyst may be blended as necessary. In the case of applying the adhesive, other additives or a catalyst such as an acid catalyst further may be blended in the aqueous solution of the adhesive. The thickness of the adhesive layer is not particularly limited but may be, for example, 1 to 500 nm, preferably 10 to 300 nm, and more preferably 20 to 100 nm. Any conventionally known methods for using adhesives such as acrylic polymers or vinyl alcohol-based polymers can be used without any particular limitations. Alternatively, the adhesive can contain a water-soluble crosslinking agents of PVA-based polymers, such as glutaraldehyde, melamine and oxalic acid. These adhesives are difficult to peel off even under an influence of humidity or heat, and they are excellent in optical transparency and polarization degree. For example, these adhesives can be coated as aqueous solutions on the surfaces of the respective components and dried before use. In the aqueous solution, for example, other additive(s) and catalyst(s) such as acids can be blended as required. Among them, for the adhesive, a PVA-based adhesive is preferred in light of the excellent adhesiveness to the PVA film.

The optical film of the present invention can include not only the above-mentioned polarizer, but any of conventionally known optical layers used in formation of image display devices, for example, a polarizing plate, a separate birefringent film, any kinds of retardation plates, a diffusion-controlling film, a brightness-enhancement film, a liquid crystal film, a light-scattering film, a diffraction film, a reflector, and a semitransparent reflector. These optical layers can be used alone or in combination of at least two kinds of layers. Such an optical layer can be provided as a single layer, or at least two optical layers can be laminated.

The retardation plates can be films obtained by, for example, stretching a polymer uniaxially or biaxially, subjecting a polymer to Z-axis alignment, or coating a liquid crystal polymer. The diffusion-control films can use films utilizing diffusion, scattering, and refraction for controlling viewing angles, or for controlling glaring and scattered light that will affect definition. The brightness-enhancement film may include a quarter wavelength plate ($\lambda/4$ plate) and a selective reflector of a cholesteric liquid crystal, and a scattering film using an anisotropic scatter depending on the polarization direction. Also, the optical film can be combined with a wire grid polarizer, for example.

In the case where the optical film of the present invention is the above-mentioned laminated polarizing plate including further a polarizer in addition to the laminate (laminated birefringent film) composed of the base and a birefringent layer, the polarizing plate is used preferably as an integrated polarizing plate that further includes the above-mentioned optical film and that has a function of optical compensation. Such an integrated polarizing plate can be arranged on a surface of a liquid crystal cell, for example, so as to be used suitably for various image display devices.

The integrated polarizing plate will be described below.

First, an example of a reflective polarizing plate or a semitransparent reflective polarizing plate will be described. The reflective polarizing plate is prepared by laminating further a reflector on a polarizing plate of the present invention, and the semitransparent reflective polarizing plate is prepared by laminating a semitransparent reflector on a polarizing plate of the present invention.

In general, such a reflective polarizing plate is arranged on a backside of a liquid crystal cell in order to make a liquid crystal display (reflective liquid crystal display) reflect incident light from a visible side (display side). The reflective polarizing plate has some merits, for example, assembling of light sources such as a backlight can be omitted, and the liquid crystal display can be thinned further.

The reflective polarizing plate can be formed in any known manner such as forming a reflector of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil comprising a reflective metal such as aluminum.

An additional example of a reflective polarizing plate is prepared by forming, on a transparent protective layer having a surface with microscopic asperities due to microparticles contained in various transparent resins, a reflector corresponding to the microscopic asperities. The reflector having a microscopic asperity surface diffuses incident light irregularly so that directivity and glare can be prevented and irregularity in color tones can be controlled. The reflector can be formed by attaching the metal foil or the metal deposited film directly on an asperity surface of the transparent protective layer by any conventional and appropriate methods including deposition and plating such as vacuum deposition, ion plating and sputtering.

As mentioned above, the reflector can be formed directly on a transparent protective layer of a polarizing plate. Alternatively, the reflector can be used as a reflecting sheet formed by providing a reflecting layer onto an appropriate film similar to the transparent protective film. Since a typical reflecting layer of a reflector is made of a metal, it is preferably used in a state such that the reflecting surface of the reflecting layer is covered with the film, a polarizing plate or the like in order to prevent a reduction of the reflection rate due to oxidation, and furthermore, the initial reflection rate is maintained for a long period, and a separate formation of a transparent protective layer is avoided.

A semitransparent polarizing plate is provided by replacing the reflector in the above-mentioned reflective polarizing plate by a semitransparent reflector, and it is exemplified by a half-mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semi-transparent polarizing plate can be used to form a liquid crystal display that can save energy for a light source such as a backlight under a bright atmosphere, while a built-in light source can be used under a relatively dark atmosphere.

The following description is about an example of a polarizing plate prepared by further laminating a brightness-enhancement film on a polarizing plate of the present invention.

A suitable example of the brightness-enhancement film is not particularly limited, but it can be selected from a multilayer thin film of a dielectric or a multilayer lamination of thin films with varied refraction aeolotropy that transmits linearly polarized light having a predetermined polarization axis while reflecting other light. Examples of such a brightness-enhancement film include trade name: "D-BEF" manufactured by 3M Co. Also a cholesteric liquid crystal layer, more specifically, an aligned film of a cholesteric liquid crystal polymer or an aligned liquid crystal layer fixed onto a supportive film base can be used as the brightness-enhancement film. Such a brightness-enhancement film reflects either clockwise or counterclockwise circularly polarized light while transmitting other light. Examples of such a brightness-enhancement film include trade name: "PCF 350" manufactured by Nitto Denko Corporation; trade name: "Transmax" manufactured by Merck and Co., Inc.

The above-mentioned various integrated polarizing plates can include further two or more optical layers in addition to the laminate (laminated birefringent film) composed of the base and the birefringent layer.

When laminating two or more optical layers, for example, the laminate can be formed by a method of laminating layers separately in a certain order for producing a liquid crystal display or the like. However, efficiency in producing a liquid crystal display can be improved by using an optical member that has been laminated previously because of its excellent stability in quality, assembling operability and the like. Any appropriate adhesives such as a pressure-sensitive adhesive layer as mentioned above can be used for lamination.

For example, the components (the laminated birefringent film and other optical layers) composing the optical film of the present invention can have ultraviolet absorption power as a result of treatment with an ultraviolet absorbent such as a salicylate compound, a benzophenone compound, a benzotriazole compound, a cyanoacrylate compound, and a nickel complex salt compound.

As mentioned above, optical films of the present invention can be used preferably for forming various devices such as liquid crystal displays. For example, an optical film of the present invention is arranged on at least one surface of a liquid crystal cell in order to form a liquid crystal panel used in a liquid crystal display of, e.g., a transmission type, a reflection type, or a transmission-reflection type.

A liquid crystal cell to compose the liquid crystal display can be selected from appropriate cells such as active matrix driving type represented by a thin film transistor, a simple matrix driving type represented by a twist nematic type and a super twist nematic type. Specifically, it can be applied to any of various cells such as an STN (Super Twisted Nematic) cell, a TN (Twisted Nematic) cell, an IPS (In-Plane Switching) cell, a VA (Vertical Aligned) cell, an OCB (Optically Compensated Birefringence) cell, a HAN (Hybrid Aligned Nematic) cell, an ASAM (Axially Symmetric Aligned Microcell) cell, a ferroelectric-antiferroelectric cell, and those subjected to systematic alignment-division or those subjected to random alignment-division. Among them, since the optical film and polarizing plate of the present invention are particularly excellent for optical compensation of a VA (Vertical Aligned) cell, they are used particularly preferably for viewing-angle compensating films for a VA mode liquid crystal display.

In general, the liquid crystal cell is composed of opposing liquid crystal cell substrates and a liquid crystal injected into a space between the substrates. The liquid crystal cell substrates can be made of glass, plastics or the like without any particular limitations. Materials for the plastic substrates can be selected from conventionally known materials without any particular limitations.

When polarizing plates or optical members are arranged on both surfaces of a liquid crystal cell, they can be the same or different type. Moreover, for forming a liquid crystal display, one or more layers of appropriate members such as a prism array sheet, a lens array sheet, an optical diffuser and a backlight can be arranged at proper positions.

The liquid crystal display of the present invention is not particularly limited as long as it includes a liquid crystal panel and the liquid crystal panel of the present invention is used therefor. When it includes a light source, preferably, the light source is a flat light source emitting polarized light for enabling effective use of light energy, though there is no particular limitation.

Figure 4:
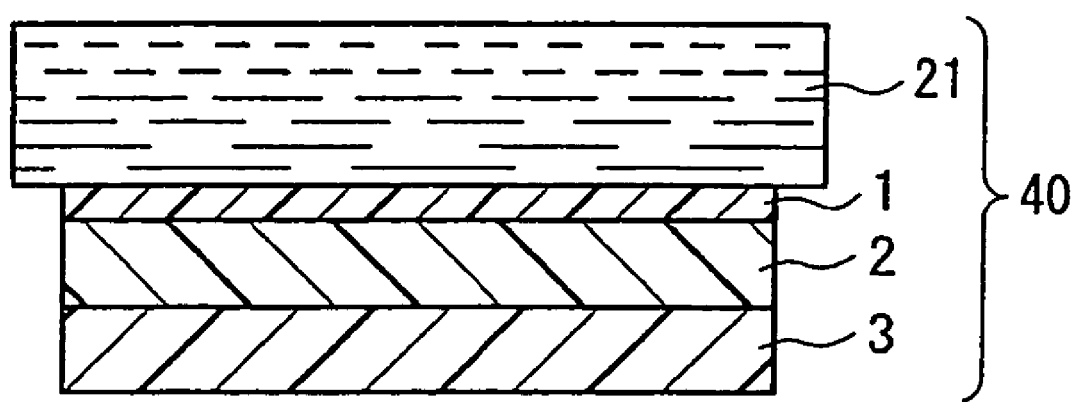
FIG. 4 is a cross-sectional view of an example of a liquid crystal panel according to the present invention.

FIG. 4 is a cross-sectional view showing one example of a liquid crystal panel of the present invention. As shown in this figure, the liquid crystal panel 40 has a liquid crystal cell 21, a laminated birefringent film 1, a polarizer 2 and a transparent protective layer 3, wherein the laminated birefringent film 1 is laminated on one surface of the liquid crystal cell 21 while the polarizer 2 and the transparent protective layer 3 are laminated in this order on the other surface of the laminated birefringent film 1. The liquid crystal cell is configured by holding a liquid crystal between two liquid crystal cell substrates (not shown). The laminated birefringent film 1 is a laminate of a base and a birefringent layer as mentioned above, where the birefringent layer side faces the liquid crystal cell 21, and the base side faces the polarizer 2.

The liquid crystal display of the present invention can include additionally on the visible side, for example, a diffusion plate, an anti-glare layer, an antireflection film, a protective layer, and a protective plate. Alternatively, a compensating retardation plate or the like can be disposed suitably between the liquid crystal cell and the polarizing plate in the liquid crystal panel.

The optical film of the present invention can be used not only in the above-described liquid crystal display but also in, for example, self-light-emitting displays such as an organic electroluminescence (EL) display, a PDP and a FED. When it is used in a self-light-emitting flat display, for example, the in-plane retardation values $\Delta$nd of the birefringent layer in the optical film of the present invention are set to $\lambda/4$ in order to obtain circularly polarized light, and thus it can be used for an antireflection filter.

The following is a specific description of an EL display comprising the optical film of the present invention. The EL display of the present invention is a device having the optical film of the present invention, and can be either an organic EL display or an inorganic EL display.

In recent EL displays, for preventing reflection from an electrode in a black state, use of an optical film such as a polarizer and a polarizing plate as well as a $\lambda/4$ plate is proposed. The optical film of the present invention is especially useful when linearly polarized light, circularly polarized light or elliptically polarized light is emitted from an EL layer. The optical film of the present invention is especially useful even when an oblique light beam is partially polarized even in the case where natural light is emitted in a front direction.

First, a typical organic EL display will be explained below. In general, such an organic EL display has a luminant (organic EL luminant) that is prepared by laminating a transparent electrode, an organic ruminant layer and a metal electrode in this order on a transparent substrate. Here, the organic luminant layer is a laminate of various organic thin films. Examples thereof include various combinations such as a laminate of a hole injection layer made of a triphenylamine derivative or the like and a ruminant layer made of a fluorescent organic solid such as anthracene; a laminate of the ruminant layer and an electron injection layer made of a perylene derivative or the like; and a laminate of the hole injection layer, the luminant layer and the electron injection layer.

In general, the organic EL display emits light according to the following principle: a voltage is applied to the anode and the cathode so as to inject holes and electrons into the organic ruminant layer, energy generated by the re-bonding of these holes and electrons excites the fluorescent substance, and the excited fluorescent substance emits light when it returns to the basis state. The mechanism of the re-bonding of these holes and electrons during the process is similar to that of an ordinary diode. This implies that current and the light emitting intensity show a considerable nonlinearity accompanied with a rectification with respect to the applied voltage.

It is required for the organic EL display that at least one of the electrodes is transparent so as to obtain luminescence at the organic luminant layer. In general, a transparent electrode of a transparent conductive material such as indium tin oxide (ITO) is used for the anode. Use of substances having small impedance for the cathode is effective for facilitating the electron injection and thereby raising luminous efficiency, and in general, metal electrodes such as Mg—Ag and Al—Li can be used.

In an organic EL display configured as described above, it is preferable that the organic ruminant layer usually is made of a film that is extremely thin such as about 10 nm, so that the organic ruminant layer can transmit substantially all light as the transparent electrode does. As a result, when the layer does not illuminate, a light beam entering from the surface of the transparent substrate and passing through the transparent electrode and the organic luminant layer is reflected at the metal layer so that it comes out again to the surface of the transparent substrate. Thereby, the display surface of the organic EL display looks like a mirror when viewed from exterior.

For example, an organic EL display of the present invention, which includes the organic EL ruminant, has a transparent electrode on the surface side of the organic luminant layer, and a metal electrode on the backside of the organic luminant layer. In the organic El display, it is preferable that an optical film of the present invention is arranged on the surface of the transparent electrode, and furthermore, a λ/4 plate is arranged between the polarizing plate and an EL element. As described above, an organic EL display obtained by arranging an optical film of the present invention can suppress external reflection and improve the visibility. It is further preferable that a retardation plate is arranged between the transparent electrode and the optical film.

The retardation plate and the optical film (e.g., a laminated polarizing plate) polarize, for example, light which enters from outside and is reflected by the metal electrode, and thus the polarization has an effect that the mirror of the metal electrode cannot be viewed from the outside. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

The following is a further description of the present invention, with reference to Examples and a Comparative Example. It should be noted that the present invention is not limited to these Examples. The properties of the optical films were measured in the following manner.

(Measurement of Retardation Value)

The retardation value was measured using a retardation meter (manufactured by Oji Scientific Instruments, trade name: KOBRA21ADH).

(Refractive Index)

Refractive indices at 590 nm were measure by using KOBRA21ADH manufactured by Oji Scientific Instruments.

(Film Thickness Measurement)

The thickness was measured with DIGITAL MICROMETER K-351C (trade name) manufactured by Anritsu.

Example 1

Polyimide having molecular weight (Mw) of 110,000, which is represented by the below-mentioned formula, was synthesized from 2,2-bis(3,4-dicarboxyphenyl)hexafluoropropane dianhydride and 2,2'-bis(trifluoromethyl)-4,4'-diaminobiphenyl, and dissolved in ethyl acetate so as to prepare a 20 wt % polyimide solution. Regarding the preparation of polyimide or the like, description of "Polymer" 40 (1999) 4571–4583, F. Li et al. was referenced to. A triacetylcellulose (TAC) film with a thickness of 80 μm was stretched 1.3 times its original length in the transverse direction by fixed-end transverse stretching at 175° C., thereby a stretched TAC film with a thickness of 78 μm was obtained. The thus stretched TAC film was coated with the polyimide solution, and heat-treated for 10 minutes at 150° C. so as to obtain an optical film. The optical film includes a completely transparent and flat stretched TAC film (a base (b)) with a thickness of 78 μm and Δn(b) of approximately 0.0006, and a polyimide film (the birefringent layer (a)) with a thickness of 6 μm and Δn(a) of approximately 0.045, being laminated on the transparent film (b). This optical film included a birefringent layer having an optical property of nx>ny>nz.

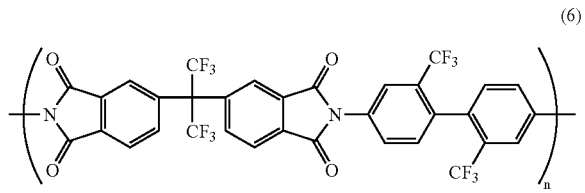

(6)

Example 2

Polyetherketone (trade name: Polyetherketone A manufactured by Nippon Shokubai Co., Ltd.) having molecular weight (Mw) of 110,000 represented by the below-mentioned figure (18) was dissolved in methyl isobutyl ketone so as to prepare a 20 wt % varnish. This varnish was coated on a stretched TAC film as in Example 1, and dried for 20 minutes at 150° C. so as to obtain an optical film. The optical film included a completely transparent and flat stretched TAC film (a transparent film (b)) with a thickness of 78 μm and a Δn(b) of approximately 0.0006, and a polyether ketone film (a birefringent layer (a)) with a thickness of 4 μm and a Δn(a) of approximately 0.038, laminated on the transparent film (b). This optical film included a birefringent layer having an optical property of nx>ny>nz.

Example 3

Polyimide (Mw=30,000) was synthesized from 4,4'-bis(3,4-dicarboxyphenyl)-2,2-diphenylpropane dianhydride and 2,2'-dichrolo-4,4'-diaminobiphenyl, and dissolved in cyclopentanone so as to prepare a 20 wt % polyimide solution. This solution was coated on an unstretched TAC film with a thickness of 80 μm, dried for 5 minutes at 130° C., and stretched 1.1 times its original length by longitudinal uniaxial stretching at 150° C. so as to obtain an optical film. The optical film included a completely transparent and flat TAC film (a transparent film (b)) with a thickness of 78 μm and a Δn(b) of approximately 0.0006, and a polyimide film (a birefringent layer (a)) with a thickness of 5 μm and a Δn(a) of approximately 0.025, being laminated on the transparent film (b). This optical film included a birefringent layer having an optical property of nx>ny>nz.

Example 4

Polyimide (Mw=100,000) was synthesized from 2,2-bis(3,4-dicarboxyphenyl)hexafluoropropane dianhydride and 2,2'-bis(trifluoromethyl)-4,4'-diaminobiphenyl, and dissolved in DMac (dimethylacetamide) so as to prepare a 20 wt % polyimide solution. This solution was coated on an unstretched TAC film with a thickness of 80 μm, dried for 5 minutes at 150° C. and stretched 1.1 times its original length by longitudinal uniaxial stretching at 150° C. so as to obtain an optical film. The optical film included a completely transparent and flat TAC film (a transparent film (b)) with a thickness of 78 μm and a Δn(b) of approximately 0.0006, and a polyimide film (a birefringent layer (a)) with a thickness of 6 μm and a Δn(a) of approximately 0.039, being laminated on the transparent film (b). This optical film included a birefringent layer having an optical property of nx>ny>nz.

Example 5

75 weight parts of alternating copolymer (containing N-methylene maleimide of 50 mol %) synthesized from isobutene and N-methyl maleimide and 25 weight parts of acrylonitrile-styrene copolymer containing 28 wt % of acrylonitrile were dissolved in methylene chloride so as to prepare a polymer solution with the solid concentration of 15 wt %. This polymer solution was flow-expanded onto a polyethylene terephthalate (PET) film arranged on a glass plate, and left for 60 minutes at room temperature. A polymer film formed on the PET film was peeled off and dried for 10 minutes at 100° C., further 10 minutes at 140° C., and still further 30 minutes at 160° C., so as to obtain a transparent film (b). The film had an in-plane retardation value (Δnd=(nx−ny)·d) of 1 nm, and a retardation value (Rth=(nx−nx)·d) of 2 nm in the thickness direction.

The thus obtained transparent film (b) was coated with the polyimide solution as in Example 1, dried for 5 minutes at 100° C., and stretched 1.1 times its original length by longitudinal uniaxial stretching at 130° C. so as to obtain an optical film. The optical film included a completely transparent and flat mixed polymer film (a transparent film (b)) with a thickness of 40 μm and a Δn(b) of approximately 0.001, and a polyimide film (a birefringent layer (a)) with a thickness of 6 μm and a Δn(a) of approximately 0.035, being laminated on the transparent film (b). This optical film included a birefringent layer having an optical property of nx>ny>nz.

Example 6

Polyimide as in Example 1 was dissolved in methyl isobutyl ketone so as to prepare a 25 wt % polyimide solution. This polyimide solution was coated on a transparent film (b) as in Example 5, and dried for 5 minutes at 135° C., and the film was stretched 1.1 times its original length by longitudinal uniaxial stretching. The thus obtained optical film included a completely transparent and flat transparent film (b) with a thickness of 40 μm and a Δn(b) of approximately 0.0006, and a polyimide film (a birefringent layer (a)) with a thickness of 10 μm and a Δn(a) of approximately

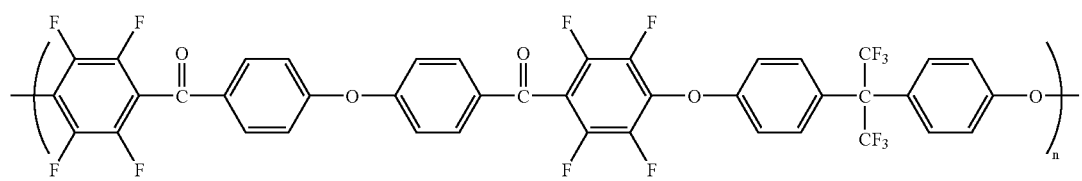

(18)

0.027, being laminated on the base (b). This optical film included a birefringent layer having an optical property of nx>ny>nz.

Comparative Example 1

A base was stretched and a birefringent layer was formed as in Example 1 except that a PET film 75 μm in thickness was used. The thus obtained optical film included a completely transparent and flat stretched PET film (base (b)) with a thickness of 75 μm and a Δn(b) of approximately 0.0006, and a polyimide film (a birefringent layer (a)) with a thickness of 6 μm and a Δn(a) of approximately 0.045, being laminated on the transparent film (b). This optical film included a birefringent layer having an optical property of nx>ny>nz.

For each of the thus obtained optical films in Examples 1–6 and Comparative Example 1, the in-plane retardation (Δnd) and the thickness direction retardation (Rth) regarding the birefringent layers, and Nz represented by the following equations, were measured.

$$\Delta nd = (nx - ny) \times d$$

$$Rth = (nx - nz) \times d$$

$$Nz = (nx - nz)/(nx - ny)$$

Cross sections of the respective optical films were observed by means of a SEM (trade name: HF2000, manufactured by Hitachi, Ltd.) in order to measure the thickness D(y) of the solvent infiltration layers.

Adhesiveness between the base and the birefringent layer in each of the optical films was evaluated by performing a test based on a regulation of JIS K 5400 8.5.1, and assessed on the basis of the regulation. In the assessment ranging from 0 to 10 (each 2 points) according to the regulation, a circle denotes 10 points, a triangle denotes 8 or 6 points, and 'X' denotes a point lower than 6.

The results are shown in the Table 1 below. Viscosities of the coating solutions used in the respective Examples and Comparative Example are shown as well.

TABLE 1

|  | MW | Solution viscosity (P · S) | Δb | Δa | Δnd (nm) | Rth (nm) | Nz (nm) | Adhesiveness | D(a) (nm) | D(y) (nm) |
|---|---|---|---|---|---|---|---|---|---|---|
| Example 1 | 110,000 | 4 | 0.0006 | 0.045 | 135 | 270 | 2.0 | 10 'o' | 6 | 0.06 |
| Example 2 | 110,000 | 4 | 0.0006 | 0.038 | 100 | 150 | 1.5 | 10 'o' | 4 | 0.04 |
| Example 3 | 30,000 | 7 | 0.0006 | 0.025 | 50 | 125 | 2.5 | 10 'o' | 5 | 0.05 |
| Example 4 | 100,000 | 1 | 0.0006 | 0.039 | 100 | 235 | 2.4 | 10 'o' | 6 | 0.60 |
| Example 5 | 110,000 | 8 | 0.001 | 0.035 | 80 | 210 | 2.6 | 10 'o' | 6 | 2.4 |
| Example 6 | 110,000 | 4 | 0.0006 | 0.027 | 60 | 270 | 2.3 | 10 'o' | 10 | 5.0 |
| Com. Ex. 1 | 110,000 | 4 | 0.0006 | 0.045 | 30 | 270 | 2.0 | 0 'x' | 6 | 0 |

* Com. Ex. = Comparative Example

As shown in the Table 1, all the optical films of the respective Examples had solvent infiltration layers and they were excellent in adhesiveness between the bases and the birefringent layers. On the contrary, no solvent infiltration layer was found in the optical film of the Comparative Example, and the adhesiveness between the base and the birefringent layer was inferior.

INDUSTRIAL APPLICABILITY

As mentioned above, according to the method for producing an optical film of the present invention, an optical film excellent in adhesiveness between a base and a birefringent layer can be obtained. The thus obtained optical film is useful since, when being applied to a liquid crystal display, it is free of optical distortion and provide a preferable visibility.

The invention claimed is:

1. A method for producing an optical film comprising a base and a biaxially birefringent layer, the method comprising: a step of coating a material of the birefringent layer on the base so as to form a coating film; and a step of solidifying the coating film on the base so as to form the birefringent layer, where the material that is coated on the base in the coating step is prepared as a coating solution by dispersing or dissolving the material in a solvent, and the solvent used exhibits solubility with respect to the base; wherein the base is composed of a transparent polymer, and the birefringent layer is formed of a polymer and laminated directly on the base, wherein the birefringent layer and the base together satisfy a formula (1) below, the birefringent layer satisfies formulae (2) and (3) below, and the polymer forming the birefringent layer has a weight-average molecular weight in a range between 10,000 and 400,000 inclusive;

$$\Delta n(a) > \Delta n(b) \times 10 \quad (1)$$

$$1 < (nx - nz)/(nx - ny) < 100 \quad (2)$$

$$0.0005 \leq \Delta n(a) \leq 0.5 \quad (3)$$

where Δn(a) denotes a birefringence of the birefringent layer and is represented by [(nx+ny)/2]−nz, wherein nx and ny and nz denote the respective indices in the X-, Y- and Z-axes directions of the birefringent layer; and Δn(b) denotes a birefringence of the base and is represented by [(nx'+ny')/2]−nz', wherein nx', ny' and nz' denote the respective indices in the X-, Y- and Z-axes directions of the base; where the X-axis direction denotes an axial direction presenting a maximum refractive index within the birefringent layer and the base, the Y-axis direction denotes an axial direction perpendicular to the X-axis within the plane, and the Z-axis direction denotes a thickness direction perpendicular to the X-axis and Y-axis.

2. The method according to claim 1, further including a step of stretching or shrinking the base before or after the solidifying step so as to stretch or shrink the coating film or the birefringent layer on the base.

3. The method according to claim 1, wherein the material for the base comprises triacetylcellulose, and the solvent comprises at least one solvent selected from the group consisting of ethyl acetate, cyclohexanone, cyclopentanone and acetone.

4. The method according to claim 1, wherein the material of the base comprises at least either an isobutene N-methylene maleimide copolymer and a acrylonitrile-styrene copolymer, and the solvent contains at least one solvent selected from the group consisting of ethyl acetate, methyl isobutyl ketone, methyl ethyl ketone, cyclohexanone, cyclopentanone and acetone.

5. The method according to claim 1, wherein the polymer of the birefringent layer comprises a non-liquid crystalline polymer.

6. The method according to claim 5, wherein the non-liquid crystalline polymer is at least one polymer selected from the group consisting of polyamide, polyimide, polyester, polyaryl ether ketone, polyether ketone, polyamide imide and polyester imide.

7. The method according to claim 1, wherein D(y) satisfies a condition below with respect to D(a):

$$D(y)>D(a)\times 0.01$$

where D(a) denotes a thickness of the birefringent layer and D(y) denotes a thickness of infiltration of the solvent into the base.

8. An optical film, which is produced in the method for producing an optical film according to claim 1.

9. The optical film according to claim 8, further comprising a polarizer.

10. A liquid crystal panel comprising a liquid crystal cell and the optical film according to claim 8, wherein the optical film is arranged on at least one surface of the liquid crystal cell.

11. A liquid crystal display comprising the liquid crystal panel according to claim 10.

12. An image display device comprising the optical film according to claim 8.

13. The method according to claim 1, wherein the thickness D(y) with respect to the thickness D(a) satisfies the condition below:

$$D(y)>D(a)\times 0.01$$

where D(a) denotes a thickness of the birefringent layer and D(y) denotes a thickness of infiltration of the solvent into the base, the material of the birefringent layer being dispersed or dissolved in the solvent.

14. An optical film comprising a base and a birefringent layer, wherein the base is composed of a transparent polymer, and the birefringent layer is formed of a polymer and laminated directly on the base, wherein the birefringent layer and the base together satisfy a formula (1) below, the birefringent layer satisfies formulae (2) and (3) below, and the polymer forming the birefringent layer has a weight-average molecular weight in a range between 10,000 and 400,000 inclusive;

$$\Delta n(a) > \Delta n(b) \times 10 \tag{1}$$

$$1 < (nx-nz)/(nx-ny) < 100 \tag{2}$$

$$0.0005 \leq \Delta n(a) \leq 0.5 \tag{3}$$

where $\Delta n(a)$ denotes a birefringence of the birefringent layer and is represented by $[(nx+ny)/2]-nz$, wherein nx and ny and nz denote the respective indices in the X-, Y-, and Z-axes directions of the birefringent layer; and $\Delta n(b)$ denotes a birefringence of the base and is represented by $[(nx'+ny')/2]-nz'$, wherein nx', ny', and nz' denote the respective indices in the X-, Y-, and Z-axes directions of the base; where the X-axis direction denotes an axial direction presenting a maximum refractive index within the birefringent layer and the base, the Y-axis direction denotes an axial direction perpendicular to the X-axis within the plane, and the Z-axis direction denotes a thickness direction perpendicular to the X-axis and Y-axis, and wherein the optical film further comprises a compatible layer in which a material of the base and a material of the birefringent layer are mixed.

15. The optical film according to claim 14, wherein a solvent residue is present in the birefringent layer and in the compatible layer.

16. The optical film according to claim 15, wherein the compatible layer has been formed by partial dissolution of the base by the solvent of a birefringent layer material.

17. The optical film according to claim 14, wherein the compatible layer has been formed by a change in a molecular disposition of the base.

* * * * *